Nov. 26, 1968     J. E. SICHLER     3,412,747
BEER KEG FITTING WITH ANNULAR CHECK VALVE FOR AIR
Filed May 2, 1966
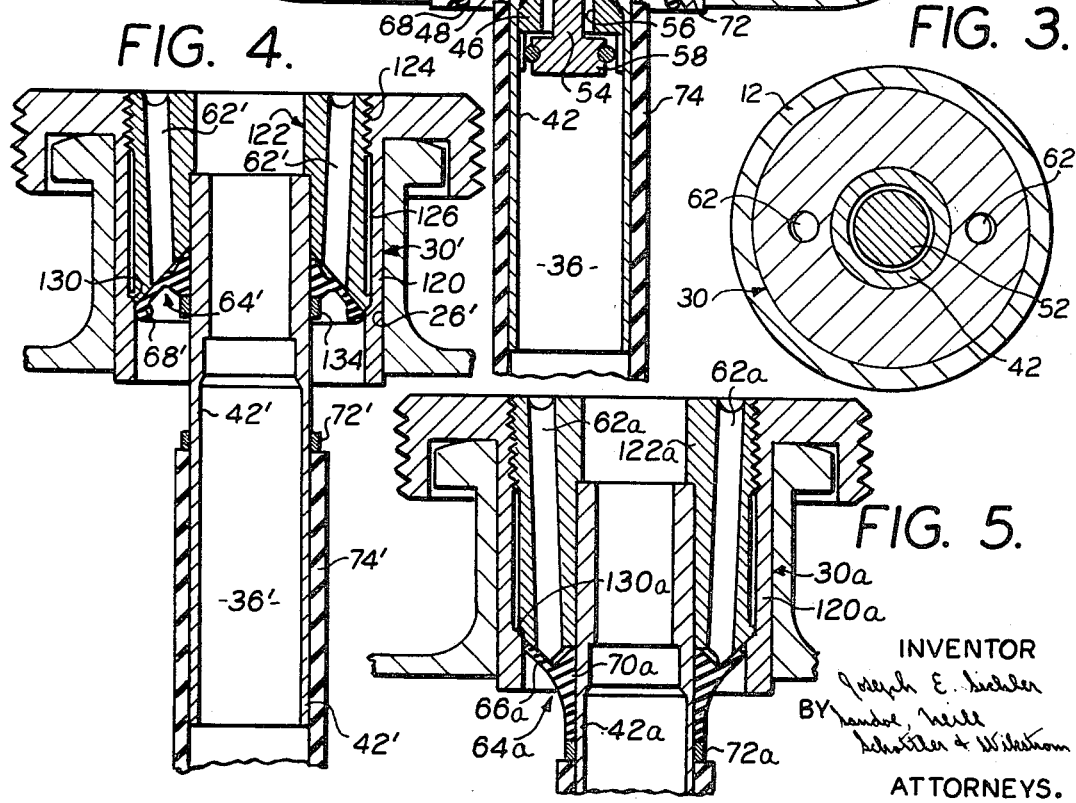

United States Patent Office 3,412,747
Patented Nov. 26, 1968

3,412,747
BEER KEG FITTING WITH ANNULAR
CHECK VALVE FOR AIR
Joseph E. Sichler, Short Hills, N.J., assignor to P.
Ballantine & Sons, Newark, N.J., a corporation of
New Jersey
Filed May 2, 1966, Ser. No. 546,713
8 Claims. (Cl. 137—212)

ABSTRACT OF THE DISCLOSURE

This specification discloses a beer keg fitting for connecting with a customer's fitting which projects into the beer keg fitting far enough to open a check valve. A gas passage opens through the keg fitting for admitting gas under pressure into the keg and there is a check valve element for the gas passage made of a flexible membrane which opens to admit gas with very little pressure differential. The memberane is strengthened by a resilient bead around its circumference to protect the membrane from being drawn into the gas passage while leaving the membrane thin over most of its radial width. For greater flexibility a frusto-conical face for the membrane produces an advantageous direction of force application for sealing without extruding the membrane in the gas passage.

---

This invention relates to fittings that are used on beer kegs for providing a connection with a customer's fitting at a tavern or other location where beer is to be dispensed from the keg.

It is an object of the invention to provide an improved fitting that goes tin the bung hole of a beer keg for preventing escape of beer and gas during shipment and before the keg is connected with a customer's distribution line. After the connection has been made, the faucet or other device of the customer's line controls the discharge of beer from the keg.

Another object is to provide a beer keg fitting, of the character indicated, with an improved check valve for the passage or passages by which gas is introduced into the keg to maintain pressure on the beer. The gas check valve is of the annular disc type and it surrounds the tubular element of the fitting through which the beer passage extends. In the preferred construction, the fitting has a frusto-conical face through which the gas passages open to the keg; and the valve has a flexible membrane portion which extends across the gas passages to close them except when gas is supplied to the fitting at a pressure in excess of the pressure in the keg; and the valve has reinforcing structure at both the outside diameter and the inside diameter of the annulus.

Other objects relate to the construction of the fitting to reduce its cost, to make connection with the beer keg more convenient, and to provide a more rugged and reliable assembly for dispensing beer and maintaining gas pressure on beer in the keg.

Other objects, features and advantages of the invention will appear or be pointed out as the description proceeds.

Brief description of the drawings

In the drawing, forming a part hereof, in which like reference characters indicate corresponding parts in all its views;

FIGURE 1 is a small scale, diagrammatic view showing a beer keg equipped with the fitting of this invention and connected with a customer's fitting for distributing beer to a distribution line;

FIGURE 2 is a greatly enlarged, sectional view showing the keg fitting of FIGURE 1 attached to the keg and showing a portion of the customer's fitting detached from the keg fitting;

FIGURE 3 is a sectional view taken on the line 3—3 of FIGURE 2;

FIGURE 4 is a fragmentary view showing a keg fitting attached to a keg, as in FIGURE 2, but with a modified construction of the keg fitting; and FIGURE 5 is a view similar to FIGURE 4 but showing a second modified form of the invention.

Description of the preferred embodiments

FIGURE 1 shows a beer keg 10 having an upper end 12 with a keg fitting 14 in the bung opening in the end 12 of the keg. A customer's fitting 16 is connected with the keg fitting 14; and there is a beer distributing line 18 leading from the customer's fitting 16 to a faucet or other point of distribution. The customer's fitting 16 has a manually operated valve 20 for opening and closing the distribution line 18. The fitting 16 also has a gas line 22 through which the gas under pressure is supplied to the keg.

FIGURE 2 shows the construction on a larger scale. The bung opening is indicated by the reference character 26; and the keg fitting 14 has a hub 30 which fits closely within the bung opening 26. At the upper end of the hub 30 there is a shoulder 32 which contacts with the upper end of the bung opening 26 to limit the extent to which the keg fitting 14 can be inserted into the bung opening 26.

The hub 30 may fit within the bung opening 26 with a press fit but it is preferably held more securely by coating the confronting faces of the bung opening 26 and hub 30 with an adhesive or a chemical bonding agent such as a plastic material which polymerizes after the parts are assembled with the result that there is actually a chemical bond between the confronting faces and the material which coats the faces.

There is a central passage 36 through the hub 30. Thus the axis of the passage 36 is coincident with the axis of the bung opening 26. Within the passage 36 there is a shoulder 40; and a tubular element 42 fits tightly within the passage 36 below the shoulder 40 and abuts against the shoulder 40. This tubular element 42 can be a press fit or it can be chemically bonded to the hub 30 in the same way that the hub is chemically bonded to the bung opening 26.

A partition 46 fits within a counterbore in the passage 36 and this partition has a spider 48 at its upper end for supporting a spring 50. The spring is compressed between the spider 48 and a collar 52 which fits over a valve stem 54 and which is secured to the valve stem 54.

A passage 56 through the partition 46 provides part of the beer passage and this passage 56 is closed by a valve element 58 when the spring 50 pushes the collar 52 as far up as the stem 54 can move. When beer is to be withdrawn from the keg 10 through the passage 36, the collar 52 is moved downward, against the pressure of the spring 50, in a manner which will be explained, and this causes the valve 58 to open.

There are two gas passages 62 extending through the hub 30 generally parallel to the beer passage 36, but preferably converging somewhat toward the bottom of the hub 30. The advantage of having the passages 62 converge is that it permits more space between the gas passages 62 and the beer passage 36 for sealing against leakage between the passages, and at the lower end of the hub 30 it has the advantage of locating the gas passages more advantageously for use with the particular type of check valve illustrated. The gas passage 62 open through the top surface of the hub 30 and also open through the bottom surface, the latter being frusto-conical over most of its area with the frusto-conical portion decreasing in diameter as it extends upward and inward.

A valve element 64 is located around the portion of the tubular element 42 which extends beyond the frusto-conical bottom face of the hub 30. The valve element 64 is preferably made of plastic material and it includes a flexible membrane portion 66 which is reinforced throughout its outer circumference by a bead 68; and which is reinforced at its center by a hub 70 of the valve element. The hub 70 fits over the tubular element 42 and hugs the tubular element so as to hold the valve element 64 in place. At least a portion of the open area of the gas passages 62 is covered by the membrane portion 66 of the valve element 64.

When pressure in the keg is greater than the pressure in the gas passages 65, the membrane portion 66 is held against the frusto-conical bottom face of the hub 30 and this seals the gas passages 62 against entrance of gas from the interior of the keg. Whenever the pressure in the gas passages 62 exceeds that in the keg by even a small amount, the valve element 64 flexes so that the bead 68 moves away from the end face of the hub 30 and the membrane portion of the valve element bends sufficiently to open a clearance for the passage of gas from the passages 62 into the interior of the keg.

The hub 70 of the valve element 64 is held against the frusto-conical bottom face of the hub 30 by a collar 72 rigidly secured to the outside of the tubular element 42. This same collar 72 serves as a stop to prevent a tube 74 from being pushed up on the tubular element 42 far enough to interfere with the operation of the valve element 64. The tube 74 fits over the tubular element 42 with a tight friction fit and this tube 42 extends to the bottom of the keg, as shown in FIGURE 1 so that the pressure on the beer in the keg can force substantially all of the contents of the keg out through the beer passage 36.

The valve element 64 is contained within the recess formed by the frusto-conical bottom face of the hub 30 and all of the valve element 64 is preferably located above the bottom limit of the hub 30. This protects the valve element 64 against damage, including possible damage when the fitting is being handled preparatory to insertion into the keg, and during assembly with the keg.

The shoulder 32 extends outwardly and then connects with a skirt 80 which extends downward across a portion of the outside of the extension of the keg in which the bung opening 26 is formed. This skirt 80 has threads 82 for receiving complementary threads 84 of the customer's fitting 16. The threads 84 are on a cap 86 that screws down over the skirt 80 and which has handles 88 for rotating it to screw it down without the use of tools.

There is a center tube 90 extending downwardly from a body 92 of the customer's fitting. This body 92 does not rotate but it is provided with a shoulder 94 and the cap 86 has a flange 96 extending over the shoulder 94 and which clamps the shoulder tightly down to hold the body 92 assembled with the keg fitting when the customer's fitting is attached to the keg fitting.

The center tube 90 fits into the upper end of the beer passage 36 of the keg fitting 14 and has an O-ring 100 which seals the clearance between the center tube 90 and the wall of the beer passage 36 before the center tube 90 has pushed the collar 52 downward to open the valve 58.

A washer 102 which fits around the center tube 90, acts as a seal for preventing leakage of beer or gas from the passages 36 and 62 of the keg fitting 14 and from the complementary passages of the customer's fitting 16. These complementary passages include a beer passage 104 which forms an extension of the passage 36 of the keg fitting and a gas passage 106 which communicates with the gas line 22 at its upper end and with an annular channel 110, in the top face of the washer 102, at the lower end of the gas passage 106.

Another annular passage 112 in the bottom face of the washer 102 registers with the openings at the top of the gas passages 62 in the hub 30 and there are openings 114 in the washer through which the upper annular channel 110 communicates with the lower annular channel 112. Thus the gas passage 106 is in communication with the gas passages 62 regardless of the angular position of the gas passage 106 around the circumference of the hub 30 and with respect to the location of the gas passages 62 in the hub 30.

FIGURE 4 shows a modified construction in which parts corresponding to those shown in FIGURE 2 are indicated by the same reference character with a prime appended. The principal difference between the construction shown in FIGURE 4, as compared with that shown in FIGURE 2, is that the hub which fits into the bung opening 26' is made in two concentric parts instead of being a single part as in FIGURE 2. For example, the hub 30' includes an outer shell 120 which fits tightly into the bung opening 26' and which may be secured in the bung opening by chemical bonding the same as in FIGURE 2. The hub 30' also includes an inner shell 122 which has threads 124 at its upper end fitting complementary threads in a counterbore 126 into which the inner shell 122 fits.

At the lower end of the counterbore 126 there is a tapered shoulder 130 which provides a seat against which a complementary face at the bottom of the shell 122 contacts. The confronting faces of the shells 120 and 122 at the shoulder 130 provide a seal for preventing leakage of gas or beer from the keg between the shells 120 and 122. This construction does provide a convenient expedient for removing the tube 42' and all of the check valves of the assembly by merely unscrewing the inner shell 122 from the outer shell 120.

The check valve 64' is the same as the check valves 64 and 62 and there is a check valve in the beer passage 36' which is of the same construction as shown in the beer passage 36 of FIGURE 2 but this beer check valve assembly is omitted in FIGURE 4 for clearer illustration.

The bottom face of the inner shell 122 is frusto-conical in the same way as the bottom face of the hub 30 of FIGURE 2, but because of the fact that the inner shell 122 is considerably shorter than the outer shell 120 there is a special collar 134 on the tubular element 42' for holding the valve 64' in position and this special collar 134 is located some distance above the collar 72' which limits the upward movement of the tubular element 42' during assembly of the structure.

FIGURE 5 shows another modification which differs from FIGURE 4 in that the assembly has a different kind of check valve for the air. Parts in FIGURE 5 which correspond to those in FIGURE 4 are indicated by the same reference characters with a letter a appended.

The hub 30a has an outer shell 120a and an inner shell 122a, the latter being longer than the corresponding inner shell of FIGURE 4. The inner shell 122a seats against a shoulder 130a in the same manner as in FIGURE 4 but the bottom face of the inner shell 122a, while it is frusto-conical, has the cone pointing in the other direction. For example, the frusto-conical surface decreases in diameter as it extends downward and inward instead of as it extends upward and inward as in FIGURES 2 and 4. This requires changes in the construction of the valve which closes the gas passages 62a.

FIGURE 5 shows a valve element 64a which has a hub portion 70a tightly gripping the tubular element 42a and held up against the end face of the inner shell 122a by a collar 72a secured to the tubular element 42a. This valve element 64a has a flexible membrane portion 66a extending across the lower ends of the gas passage 62a. Ordinarily no reinforcing bead around the outer circumference of the valve element 64a is provided because the valve 64a opens toward the outer shell 120a in FIG.

5 instead of away from it as is the case with the valve 64' and its outer shell 126 as in FIGURE 4.

Because of the fact that there is less clearance for a circumferential bead on the valve element in the FIGURE 5 construction, it is necessary to use a somewhat stiffer membrane portion 66a and this makes the valve 64a less sensitive.

With the FIGURE 4 construction, the bead 68 which is substantially tangent to the upper surface of the membrane portion of the valve, or slightly lower, preferably contacts with the outer shell 120 and serves as an O-ring for providing sealing at the shoulder 130 as well as providing extra sealing for the gas passages 62'.

Similar extra sealing protection for the passage 62 in FIGURE 1 is obtained by having the lower end of the frusto-conical face of the hub 30 merge into a substantially cylindrical wall along a curve having a radius equivalent to that of the bead 68 and in contact with the bead.

The preferred embodiments of the invention have been illustrated and described. Terms of orientation are, of course relative. Changes and modifications can be made and some features can be used in different combinations without departing from the invention as defined in the claims.

What is claimed is:

1. A beer keg fitting for connection with a customer's fitting having a beer passage and a gas passage therein, the beer keg fitting including a hub that fits into a bung opening of a keg, the hub having a shoulder in position to contact with the keg around the upper and outer end of the bung opening to limit the insertion of the hub into the bung opening, a tubular element extending from the lower end of the hub and having a tube connected thereto for reaching beer down in the keg, a bottom face on the hub, a gas passage opening through the top of the keg fitting and through said bottom face at the lower end of the hub, a valve element including an annular portion that covers the gas passage opening in said bottom face, the valve element having a resilience that holds it aaginst the bottom face so as to close the gas passage against discharge of gas from the keg, the valve element being relatively fixed on one side to swing about its fixed portion and permit flow of gas into the keg when pressure in the gas passage exceeds that in the keg, the bottom face of the hub through which the passages open being frusto-conical, the entire area of the frusto-conical face being above the lower end of the rest of the hub, the valve element being a flexible membrane with a resilient bead around its circumference radially outward from the gas passage, and a hub at the inner limit of the membrane and radially inward of the gas passage, the hub of the valve element being fixed on a portion of the fitting, and the flexible membrane of the valve extending across the end of the gas passage that opens through the frusto-conical surface.

2. The beer keg fitting described in claim 1 characterized by the hub of the valve element being a ring of elastometric material that fits snugly around the tubular element that extends from the lower end of the hub.

3. The beer keg fitting described in calim 1 characterized by the hub of the valve element being a ring of elastometric material that is held in a relatively fixed position by a part of the keg fitting, and the valve element having a circumferential groove in its outside surface adjacent to the region at which the membrane portion of the valve element merges with the hub of the valve element to obtain a thin annular section about which the lower part of the valve element hinges to move away from and toward said gas passage through the hub.

4. The beer keg fitting described in claim 2 characterized by the tube being a hose that fits over said tubular element, and a shoulder connected with the tubular element below the valve element in position to serve as a stop for preventing the tube from being pushed up on the tubular element far enough to strike the valve element.

5. A beer keg fitting for connection with a customer's fitting having a beer passage and a gas passage therein, the beer keg fitting including a hub that fits into a bung opening of a keg, the hub having a shoulder in position to contact with the keg around the upper and outer end of the bung opening to limit the insertion of the hub into the bung opening, a tubular element extending from the lower end of the hub and having a tube connected thereto for reaching beer down in the keg, a bottom face on the hub, a gas passage opening through the top of the keg fitting and through said bottom face at the lower end of the hub, and a valve element including an annular portion that covers the gas passage opening in said bottom face, the valve element having a resilience that holds it against the bottom face so as to close the gas passage against discharge of gas from the keg, the valve element being relatively fixed on one side to swing about its fixed portion and permit flow of gas into the keg when pressure in the gas passage exceeds that in the keg, and characterized by the hub being of composite construction including an inner part through which the beer and gas passages extend and an outer part that surrounds the inner part and that contacts with the inside surface of the bung opening and that has the shoulder thereon, the inner part having a bottom surface thereon through which the gas passages open, and the outer part extending for some distance beyond said bottom surface and beyond the movable portion of the valve element whereby the movable portion of the valve element is in a protective recess at the lower end of the fitting.

6. The beer keg fitting described in claim 5 characterized by the outer part of the hub having a counterbore into which the inner part of the hub fits, threads on the inner part that screw into complementary threads in the counterbore of the outer part, a shoulder of the outer part at the lower end of the counterbore and against which the inner part of the hub seats to seal the clearance between the inner and outer parts of the hub.

7. The beer keg fitting described in claim 6 characterized by the lower end of the inner part being frusto-conical and all of it located above the lower end of the outer part, the frusto-conical surface decreasing in radius as it extends downward and inward.

8. The beer keg fitting described in claim 6 characterized by the lower end of the inner part being frusto-conical and all of it being located above the lower end of the outer part, the frusto-conical surface decreasing in radius as it extends upward and inward.

References Cited

UNITED STATES PATENTS

| | | | |
|---|---|---|---|
| 2,747,609 | 5/1956 | Sekera | 137—525.3 X |
| 3,077,894 | 2/1963 | Cummings | 137—155 |
| 3,090,530 | 5/1963 | Peeps | 222—400.7 |
| 3,231,154 | 1/1966 | Johnston | 222—400.7 |

ALAN COHAN, *Primary Examiner.*